(12) United States Patent
Pirri et al.

(10) Patent No.: US 8,466,214 B2
(45) Date of Patent: Jun. 18, 2013

(54) CORE-SHELL IMPACT MODIFIERS FOR TRANSPARENT POLYMER MATRICES

(75) Inventors: Rosangela Pirri, Montardon (FR); Philippe Hajji, Chatillon d'Azergues (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/057,555

(22) PCT Filed: Aug. 4, 2009

(86) PCT No.: PCT/FR2009/051554
§ 371 (c)(1),
(2), (4) Date: Feb. 22, 2011

(87) PCT Pub. No.: WO2010/015779
PCT Pub. Date: Feb. 11, 2010

(65) Prior Publication Data
US 2011/0136980 A1    Jun. 9, 2011

(30) Foreign Application Priority Data
Aug. 5, 2008   (FR) ..................... 08 55423

(51) Int. Cl.
*C08L 51/04* (2006.01)
*C08L 9/00* (2006.01)
*C08L 45/00* (2006.01)

(52) U.S. Cl.
USPC .......... 523/201; 525/63; 525/64; 525/67; 525/70; 525/71; 525/261

(58) Field of Classification Search
USPC .......... 523/201; 525/63, 261, 64, 67, 70, 525/71
See application file for complete search history.

(56) References Cited

U.S. PATENT DOCUMENTS

| | | | |
|---|---|---|---|
| 6,369,158 B1 * | 4/2002 | Senyek et al. | 524/836 |
| 6,512,081 B1 | 1/2003 | Rizzardo et al. | |
| 6,596,899 B1 | 7/2003 | Lai | |
| 6,642,318 B1 | 11/2003 | Chiefari et al. | |
| 6,747,111 B2 | 6/2004 | Chiefari et al. | |
| 7,230,063 B1 | 6/2007 | Parker | |
| 7,250,479 B2 | 7/2007 | Le et al. | |
| 7,662,986 B2 | 2/2010 | Le et al. | |
| 7,666,962 B2 | 2/2010 | Le et al. | |
| 7,714,075 B1 | 5/2010 | Le et al. | |
| 2004/0024132 A1 | 2/2004 | Chiefari et al. | |
| 2006/0063891 A1 | 3/2006 | Ruzette et al. | |
| 2006/0074148 A1 | 4/2006 | Ahn et al. | |
| 2008/0139836 A1 | 6/2008 | Le et al. | |
| 2009/0005529 A1 | 1/2009 | Lai | |
| 2010/0255329 A1 * | 10/2010 | Couvreur | 428/511 |

FOREIGN PATENT DOCUMENTS

| | | | |
|---|---|---|---|
| EP | 1801100 | | 6/2007 |
| FR | 2919290 | * | 2/2009 |
| WO | WO98/01478 | | 1/1998 |
| WO | WO99/05099 | | 2/1999 |
| WO | WO99/31144 | | 6/1999 |
| WO | WO01/60792 | | 8/2001 |
| WO | WO2004/058839 | | 7/2004 |

* cited by examiner

*Primary Examiner* — Jeffrey Mullis
(74) *Attorney, Agent, or Firm* — Lynn B. Morreale

(57) ABSTRACT

Processes for making a core and core-shell copolymers are provided herein. Processes for making crosslinked elastomeric core particles includes emulsion polymerizing, in the presence of a radical polymerization initiator, a polymerization mixture containing at least one ethylenic elastomeric monomer, at least one crosslinking agent, and at least one sulfur-containing additive of the formula I below, where R and Z are defined herein.

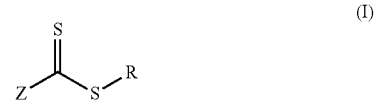

(I)

The core-shell copolymers formed are useful for example as additives in polymer matrices such as for modifying impact strength and improving optical properties.

22 Claims, No Drawings

CORE-SHELL IMPACT MODIFIERS FOR TRANSPARENT POLYMER MATRICES

CROSS-REFERENCE TO RELATED APPLICATIONS

This application is a national stage application under 35 U.S.C. §371 of PCT/FR2009/051554, filed Aug. 4, 2009, which claims benefit to French application FR 0855423, filed on Aug. 5, 2008, all of which are hereby incorporated by reference.

FIELD OF INVENTION

The core-shell copolymers thus obtained have an application in particular as impact modifier for polymer matrices, in particular for polymer matrices where it is important to retain the initial optical transparency.

The general field of the invention is thus that of impact modifiers capable of reinforcing the impact strength of polymer matrices into which they are introduced, in particular for transparent polymer matrices, such as polycarbonate matrices.

BACKGROUND OF THE INVENTION

In the field of polymers, in particular when the polymers are brittle, it is common practice to add additives in order to confer impact strength on these polymers (these additives commonly being denoted under the terminology of "impact modifier").

Thus, these additives can be provided in the form of elastomeric particles introduced into the polymer matrix. For example, MBS additives, MBS denoting a particulate copolymer comprising a crosslinked core based essentially on butadiene and styrene and a polymethyl methacrylate shell, can be used to reinforce the impact strengths of various polymer matrices, such as rigid PVC matrices, polycarbonate matrices or polyester matrices, it being possible for the applications targeted to be construction materials, such as window sections, or packaging materials for products in everyday use (such as computer or telephone casings).

There may exist a number of applications where the initial optical transparency of the polymer has to be maintained after addition of said additives.

One solution which can be envisaged for maintaining the optical transparency of the polymer is to alter the chemical composition of the additive by adjusting the composition so that the refractive index of the additive is close to that of the polymer matrix in which the additive is intended to be incorporated. Thus, before the incorporation of the additive in the matrix, it is necessary to carry out refractive index measurements on said synthesized additive in order to be able to determine if it is suitable for the matrix for which it is intended. The aim is to avoid or greatly restrict the phenomenon of light scattering which would result in the opaqueness of the initially transparent matrix. Mention may be made, as example of additive capable of being incorporated in a transparent matrix, such as a polyvinyl chloride matrix, without harming the initial transparency of the latter, of a core-shell additive of the MBS type, the shell of which is composed of units resulting from the polymerization of methyl methacrylate and the core of which is composed of units resulting from the polymerization of 1,4-butadiene and styrene.

However, the fact of having to alter the composition of the additives in order to maintain the transparency properties of the recipient polymer matrix sometimes contributes to reducing the effectiveness of the additive as regards its ability to reinforce the impact strength of the matrices for which it is intended. Thus, in the case of the MBS core-shell additives for polyvinyl chloride matrices, the presence of styrene units in an increasing content in the core reduces the elastomeric nature of the additive (in particular by increasing the glass transition temperature and the elastic modulus) and consequently its effectiveness.

For specific polymer matrices, such as polycarbonate matrices, it is also impossible to adjust the refractive index of an additive so that the latter protects the optical transparency properties of the host matrix. However, some authors have provided block copolymers (such as described in WO 2003/062293). In this case, the transparency of the host polymer matrix depends entirely on the nanostructuring which occurs during the processing of the blend composed of the constituent polymer of the matrix and of the block copolymer. This nanostructuring can only occur under certain conditions, such as:

the compatibility between the matrix and one of the blocks of the additive used;
the blending conditions, such as the shear rate;
the kinetics of cooling after the blending.

In other words, the final optical transparency of a matrix reinforced by the additive will never be certain of being maintained as it depends on complex mechanisms of separation of phases. There thus exists a true need for a process for the preparation of polymer additives, which additives can be used in polymer matrices without harming their transparency properties, which is simple to implement, in particular so as to be able to be carried out in an industrial environment.

SUMMARY OF INVENTION

The Inventors have discovered, surprisingly, that, by producing the core part of a core-shell copolymer by radical emulsion polymerization in the presence of a specific sulfur-comprising additive, in addition to the polymerization initiator, it was possible to substantially reduce the size of the core with respect to a polymerization medium not comprising such an additive.

Thus, the invention relates to a process for the manufacture of the core of a copolymer of core-shell type forming a suspension of particles, said core being a crosslinked elastomeric core comprising a stage of radical emulsion polymerization of at least one ethylenic elastomeric monomer and of a crosslinking agent in the presence of a radical polymerization initiator and of a sulfur-comprising additive corresponding to the following formula (I):

in which:
R is chosen from —$CH_2R^1$, —$CHR^1R'^1$ and —$CR^1R'^1R''^1$, with $R^1$, $R'^1$ and $R''^1$, which are identical or different, each representing, independently of one another, a group chosen from optionally substituted alkyl groups, saturated or unsaturated and optionally aromatic carbocyclic or heterocyclic groups, said groups optionally being substituted, optionally substituted alkylthio groups, optionally substituted alkoxy groups, optionally substituted dialkylamino groups, organometallic groups, acyl groups, acyloxy groups, carboxyl groups and their salts, carboxylic acid ester groups, sulfonic acid groups and their salts, sulfonic acid ester groups, alkoxy- or aryloxycarbonyl groups and polymer groups; and Z is chosen from H, halogen atoms, optionally substituted alkyl groups, optionally substituted aryl groups, optionally substituted heterocyclic groups, optionally substituted —$SR^2$ groups, optionally substituted alkoxycarbonyl groups, optionally substituted aryloxycarbonyl groups, carboxyl groups —COOH, acyloxy groups —$OCOR^2$, optionally substituted carbamoyl groups of formula —$CONHR^2$ or —$CONR^2R^3$, cyano groups —CN, —$P(=O)OR^2{}_2$ groups, —$P(=O)R^2{}_2$ groups, polymer groups, —$OR^2$ groups and —$NR^2R^3$ groups; and $R^2$ and $R^3$, which are identical or different, are chosen from the group consisting of $C_1$ to $C_{18}$ alkyl groups, $C_2$ to alkenyl groups, $C_6$ to $C_{18}$ aryl groups, heterocyclic groups, aralkyl groups and alkaryl groups, each of these groups optionally being substituted by at least one substituent chosen from epoxy groups, hydroxyl groups, alkoxy groups, acyl groups, acyloxy groups, carboxyl groups and their salts, carboxylic acid ester groups, sulfonic acid groups and their salts, sulfonic acid ester groups, alkoxy- or aryloxycarbonyl groups, isocyanato groups, cyano groups, silyl groups, halogen groups or dialkylamino groups.

The group R as defined above can be released in the form of a radical which initiates the polymerization by free radicals.

Mention may in particular be made, among sulfur-comprising additives, of dithioesters (compounds comprising at least one —C(=S)S— group), dithiocarbonates or xanthates (compounds comprising at least one —O—C(=S)S— group), dithiocarbamates (compounds comprising at least one —N—C(=S)S— group) and trithiocarbonates (compounds comprising at least one —S—C(=S)S— group).

Thus, the Inventors have been able to observe that, by providing a sulfur-comprising additive as defined above in the polymerization medium, it is possible to obtain a suspension of particles (said particles being intended to form the core of the core-shell copolymer) with a mean diameter which is lower than that which would be obtained in a polymerization medium not comprising such an additive. It is possible in particular to obtain a suspension of particles exhibiting a mean particle diameter of less than 50 nm.

Without wishing to be committed in any way by a theory, the authors believe that the reduction in size of the particles is due to the fact that the sulfur-comprising additives as defined above are grafted to the growing particle, making it possible to improve the colloidal stability and reduce the size of the particles.

Any phenomenon of light scattering is prevented by virtue of a very small particle size. It is thus possible to use a large panel of elastomeric monomers to form the core, without worrying about the refractive index resulting from the particles obtained by polymerization of said monomers.

DETAILED DESCRIPTION OF CERTAIN
EMBODIMENTS OF THE INVENTION

The process of the invention is a process which is simple to implement as it is based on the well-known principles of radical emulsion polymerization. This process is capable of being easily implemented in an industrial environment, with good yields.

Before going in more detail into the description of the sulfur-comprising additives of formula (I), it is appropriate to provide the following definitions.

The term "alkyl group" is understood to mean conventionally a linear or branched alkyl group which can comprise from 1 to 18 carbon atoms.

The term "alkylthio group" is understood to mean conventionally an —S-alkyl group, it being possible for alkyl to correspond to the same definition as that given above, the bonding to the remainder of the molecule taking place via the sulfur atom.

The term "alkoxy group" is understood to mean conventionally an —O-alkyl group, it being possible for alkyl to correspond to the same definition as that given above, the bonding to the remainder of the molecule taking place via the oxygen atom.

The term "carboxylic acid ester group" is understood to mean conventionally a group resulting from a carboxyl group —COOH, in which the —OH group has been replaced by a hydrocarbon radical.

The term "sulfonic acid ester group" is understood to mean conventionally a group resulting from a sulfonic acid group —$SO_3H$, in which an —OH group has been replaced by a hydrocarbon radical.

The term "polymer group" is understood to mean conventionally a group comprising a sequence of repeat units resulting from the polymerization of one or more monomers, it being possible for any polymerization mechanism to be employed.

The term "aralkyl group" is understood to mean conventionally an aryl group substituted by at least one alkylene group, which alkylene group forms a bridge between the aryl group and the remainder of the molecule. An example of aralkyl group is the benzyl group.

The term "alkaryl group" is understood to mean conventionally an aryl group substituted by at least one alkyl group, the bonding to the remainder of the molecule taking place via the aryl group. An example of alkaryl group is the tolyl group.

The possibility is mentioned of some groups defined in the formula (I) being able to be substituted. The substituents can be conventionally chosen from epoxy groups, hydroxyl groups, alkoxy groups, acyl groups, acyloxy groups, carboxyl groups (and their salts), carboxylic acid ester groups, —$SO_3H$ (and their salts), sulfonic acid ester groups, alkoxy- and aryloxycarbonyl groups, isocyanato groups, cyano groups, silyl groups, halogen groups and dialkylamino groups.

Sulfur-comprising additives capable of being advantageously used in the context of the invention are additives corresponding to the following formula (II):

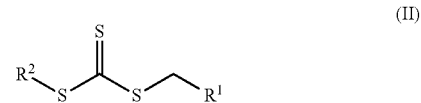

(II)

in which $R^1$ and $R^2$ correspond to the same definitions as those given above.

In particular, $R^1$ can correspond to an aryl group, such as a phenyl group, while $R^2$ can correspond to an aralkyl group, such as a benzyl group.

A sulfur-comprising additive which is particularly advantageous is dibenzyl trithiocarbonate (DBTTC), corresponding to the following formula (III):

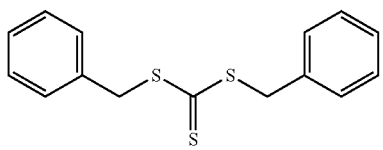

(III)

Thus, the sulfur-comprising additive used is preferably DBTTC (CAS No. 26505-29-0).

Sulfur-comprising additives capable of being used in the context of the invention can be additives of formula (I) for which R is a —$CHR^1R^{i1}$ group, with $R^1$ representing an alkyl group, such as a methyl group, and $R^{i1}$ representing a carboxyl group, and Z represents an —$SR^2$ group, with $R^2$ representing an alkyl group substituted by a carboxyl group, such as a carboxyprop-2-yl group.

A sulfur-comprising additive corresponding to the above definition is dipropyl trithiocarbonate (DPTTC) (CAS No. 6332-91-8) corresponding to the following formula (IV):

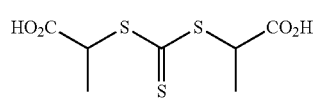

(IV)

or its salts, particularly the sodium salt (CAS No. 86470-33-2).

The sulfur-comprising additive is introduced, advantageously, in the polymerization stage, at a content which can range from 0.005 part by weight to 5 parts by weight, per 100 parts of monomers, and preferably from 0.01 to 2 parts by weight, per 100 parts of monomers.

The elastomeric ethylene monomers capable of being polymerized in the context of the process of the invention can be of any type known to a person skilled in the art, it being understood that the polymer resulting from the polymerization of said monomers will conventionally have a glass transition temperature (Tg) which is less than ambient temperature, preferably less than 10° C., more preferably less than 0° C. According to a specific and advantageous embodiment of the invention, said monomers can be chosen from an isoprene, a butadiene (such as 1,4-butadiene), styrene, acrylonitrile, an alkyl (meth)acrylate and the mixtures of these. Use may be made, as examples of mixtures of monomers, of the styrene/alkyl acrylate, styrene/alkyl methacrylate or styrene/butadiene mixtures.

In particular, the elastomeric monomer can be an alkyl acrylate, such as n-butyl acrylate.

The crosslinking agent is conventionally a monomer comprising at least two ethylenic functional groups. Preferably, the crosslinking agent comprises ethylenic functional groups chosen from the vinyl, allyl, acrylic or methacrylic functional group and their mixtures. In particular, the crosslinking agent can be divinylbenzene, trivinylbenzene, vinyl acrylate, allyl methacrylate $CH_2$=$C(CH_3)COOCH_2CH$=$CH_2$, vinyl methacrylate $CH_2$=$C(CH_3)COOCH2CH_2$, poly(meth)acrylic esters of polyols, such as butadienediol diacrylate, hexanediol diacrylate, PEG diacrylate (PEG meaning polyethylene glycol), trimethylolpropane trimethacrylate and the mixtures of these.

Advantageously, when the elastomeric monomer is an alkyl (meth)acrylate, the crosslinking agent can correspond to allyl methacrylate.

The crosslinking agent is advantageously included in the polymerization medium in the proportion of a content ranging from 0.01 part by weight to 10 parts by weight, per 100 parts by weight of monomer(s), preferably from 0.1 part by weight to 2 parts by weight, per 100 parts by weight of monomer(s).

The polymerization initiator of the invention is a radical polymerization initiator capable of generating, by reaction with monomers, free radicals from which the polymerization reaction will be propagated.

This radical polymerization initiator can be of any type, for example of the following types:
 azo compounds, such as azobisisobutyronitrile (AIBN);
 organic peroxides, such as t-butyl hydroperoxide, cumene hydroperoxide, benzoyl peroxide or lauroyl peroxide;
 persulfate salts, such as sodium persulfate, potassium persulfate or ammonium persulfate.

In particular, the polymerization initiator can be a persulfate salt, such as potassium persulfate, in particular when the monomer is n-butyl acrylate.

The radical emulsion polymerization stage can advantageously be carried out in the presence of at least one surfactant and optionally of at least one chain-transfer agent which makes it possible to regulate the molecular weight of the chains produced during the polymerization stage.

Mention may be made, as surfactants capable of being used, of anionic surfactants, such as a fatty acid salt, an alkyl sulfate salt (such as sodium lauryl sulfate), an alkylbenzenesulfonate salt (such as sodium dodecylbenzenesulfonate), an alkyl phosphate salt or a sulfosuccinate diester salt, nonionic surfactants, such as a polyoxyethylene alkyl ether or a polyoxyethylene fatty acid ester, cationic surfactants, such as quaternary alkyl- and/or arylammonium halides, or zwitterionic or amphoteric surfactants, such as surfactants comprising a betaine group.

Mention may advantageously be made, as chain-transfer agents, of mercaptan compounds comprising at least 4 carbon atoms, such as butyl mercaptan, n-octyl mercaptan, n-dodecyl mercaptan or tert-dodecyl mercaptan.

According to the invention, the emulsion polymerization stage is carried out conventionally in an aqueous dispersion medium.

The advantage of operating with such a dispersion medium is that the process is a clean process, which is particularly advantageous in an industrial environment.

From a practical viewpoint, the radical emulsion polymerization stage can be carried out in the following way:
 the preparation of a first mixture by bringing a surface-active agent and a dispersion medium into contact, said dispersion medium preferably being water;
 the preparation of a second mixture by bringing said ethylenic elastomeric monomer and said crosslinking agent into contact in the presence of said sulfur-comprising agent and optionally in the presence of a chain-transfer agent;
 a stage in which said first mixture and said second mixture are brought into contact, it being possible for the second mixture to be introduced into said first mixture batchwise (that is to say, in a single stage without delay) or semicontinuously or continuously (the introduction being carried out in stages over a period of time which can range from several minutes to several hours for the semicontinuous method or in a single stage over a period of time which can range from several minutes to several hours);
 a stage of addition to the resulting mixture of the polymerization initiator, it being possible for the stage of addition to be carried out batchwise (that is to say, in a single stage without delay) or semicontinuously or continuously (the introduction being carried out in stages over a period of time which can range from several minutes to several hours for the semicontinuous method or in a single stage over a period of time which can range from several minutes to several hours).

A specific embodiment of the invention is that for which:
the ethylenic elastomeric monomer is n-butyl acrylate;
the crosslinking agent is allyl methacrylate;
the sulfur-comprising additive is dibenzyl trithiocarbonate;
the polymerization initiator is a potassium persulfate salt.

The aim of the abovementioned process is the manufacture of the core of a copolymer of core-shell type. Thus, the invention relates to a core-shell copolymer capable of being obtained by a process as defined above which exhibits a mean size for the core particles of less than 50 nm, preferably of less than 40 nm and more preferably of less than 30 nm.

The process for the manufacture of a core can constitute a stage coming within the context of the production of a core-shell copolymer.

The invention thus also relates to a process for the preparation of a core-shell copolymer comprising the following stages:
a stage of carrying out the process for the manufacture of the core of a core-shell copolymer as defined above;
a stage of producing the shell by bringing the core obtained in the preceding stage into contact with at least one monomer intended to participate in the formation of the shell.

The monomers capable of participating in the formation of the shell can be of any type but are chosen in particular so that the polymer resulting from the polymerization of these monomers exhibits a glass transition temperature (Tg) which is greater than ambient temperature and that the resulting polymer is compatible with the matrix in which the core-shell copolymers are intended to be incorporated. The term "Tg which is greater than ambient temperature" is understood to mean a polymer or a copolymer having a Tg of greater than 25° C., preferably of between 40 and 150° C. and more preferably of between 60° C. and 140° C. Mention may nonexhaustively be made of alkyl (meth)acrylates, styrene monomers, acrylonitrile and the mixtures of these. In particular, the shell can be made of polymethyl methacrylate, of polystyrene or of methyl methacrylate/styrene copolymer. In particular, the monomer intended to participate in the formation of the shell can be methyl methacrylate.

From a practical viewpoint, the stage of producing the shell can take place in the following way:
a stage of addition to the preformed core of a monomer or of a preprepared mixture of monomers intended to participate in the formation of the shell, it being possible for this addition to be carried out according to a batchwise method (that is to say, in a single stage without delay) or semicontinuously or continuously (the introduction being carried out in stages over a period of time which can range from several minutes to several hours for the semicontinuous method or in a single stage over a period of time which can range from several minutes to several hours);
simultaneously with or subsequent to this stage of addition, a stage of introducing a polymerization initiator according to a batchwise method or a semicontinuous or continuous method as mentioned above.

The abovementioned process can comprise, on conclusion of the stage of producing the shell, a stage of recovery of said core-shell copolymer particles obtained, by conventional techniques for the recovery of latexes (such as atomization or coagulation), in order to recover a powder. Said core-shell copolymers form a suspension of core-shell particles with a mean particle diameter of less than 60 nm, preferably of less than 50 nm and more preferably of less than 40 nm.

As mentioned above, the use of a sulfur-comprising additive as mentioned above makes it possible to obtain a polymer core in suspension intended to participate in the formation of a core-shell copolymer exhibiting a mean size for the core particles of less than 50 nm and a mean diameter for the core-shell particles of less than 60 nm.

Thus, the invention relates to the use of a sulfur-comprising additive as defined above in the preparation of a core particle used to participate in the formation of a core-shell copolymer by radical emulsion polymerization of an ethylenic elastomeric monomer and of a crosslinking agent for the purpose of obtaining a mean size for the particles of said core of less than 50 nm.

The apparatus used for the determination of the particle size distribution is a "Zetasizer 5000" (Malvern Instruments Ltd) operating in the 5-3000 nm range. The technique used by the apparatus is photon correlation spectroscopy (abbreviation PCS, standard ISO 13321).

The median is the diameter which divides the distribution into two parts of equal areas. It is denoted $D_{50}$. If the distribution is by volume, it may be said that 50% of the total volume of the particles corresponds to the volume of the particles with diameters of less than $D_{50}$. If the distribution is by number, it may be said that 50% of the particles have a size of less than $D_{50}$. The term "$D_{50}$ mean diameter" or "mean particle diameter" is understood to mean a diameter such that 50% of the particles by weight have a size which is less than said diameter.

The core-shell copolymers in the form of particles are intended in particular to be incorporated in a polymer matrix. Due to the small size of the core-shell particles (in particular the size of the core, the shell generally being dispersed in the matrix due to its compatibility with the latter), the effectiveness of the copolymers will be all the greater, in particular due to the covering of the stress field generated by these, when the main mechanism of deformation of the polymer matrix is a plastic flow mechanism known as shear yielding.

Thus, the core-shell copolymers obtained by the process of the invention can be used as impact modifier intended to participate in the formation of a polymer matrix, the distinctive feature of these copolymers being, in addition, that they protect the optical transparency of the matrices in which they are included. Said polymer matrix can be thermoplastic or thermosetting. Said core-shell copolymers can be included in a polymer matrix in a proportion of 1 to 50% by weight, with respect to the weight of the matrix, preferably from 2 to 20%.

According to the invention, the thermoplastic matrix can be a matrix based on polyvinyl chloride, ABS (corresponding to an acrylonitrile/butadiene/styrene copolymer), ASA (corresponding to an acrylate/styrene/acrylonitrile copolymer), polycarbonate/polyester, polycarbonate/ABS, polycarbonate/ASA or the blends of these. In particular, the abovementioned core-shell copolymers are particularly suitable for matrices made of polycarbonate, of polyester or of epoxy resin.

It is specified that the term "impact modifier" is understood to mean an additive capable of enhancing the impact properties and/or impact strength properties and/or strength properties of a polymer matrix in which it is incorporated.

Thus, the invention also relates to a polymer matrix comprising at least one core-shell copolymer as defined above, it being possible for said matrix to be a thermoplastic matrix as defined above.

The invention also relates to a manufactured article comprising a polymer matrix as defined above, it being possible for this manufactured article to be produced by injection molding, molding, extrusion or extrusion-blow molding. Mention may be made, as examples of manufactured articles, of construction materials, such as window sections, or packaging materials for products in everyday use, such as computer or telephone casings.

The invention will now be described with respect to the following examples, which are given by way of illustration and without implied limitation.

DETAILED ACCOUNT OF SPECIFIC EMBODIMENTS

Example 1

Comparative

A solution is prepared comprising 0.24 g of NaHCO$_3$ (fulfilling the role of pH buffer), 10.14 g of surfactant SLS (sodium lauryl sulfate) and 485 g of distilled water. The mixture is stirred and heated (up to approximately 50° C., until the surfactant has completely dissolved).

At the same time, a mixture is prepared comprising 0.11 g of chain-transfer agent tert-dodecyl mercaptan (abbreviation TDM), 220 g of n-butyl acrylate and 1.33 g of allyl methacrylate.

The two above mixtures are introduced, with stirring at 150 revolutions/minute and at 65° C., into a 1 liter jacketed reactor placed under vacuum beforehand.

The medium is deoxygenated with 3 cycles of placing under vacuum and then under nitrogen, in order to render the atmosphere of the reactor inert, and then the medium is left under vacuum at 65° C. before introducing the initiator.

A solution is prepared comprising the polymerization initiator, potassium persulfate, in a proportion of 0.22 g in 15 g of water.

The solution obtained is introduced into an airlock while flushing with nitrogen and is then injected into the reactor by nitrogen pressure. The airlock is rinsed with 40 g of water, still under nitrogen, the rinsing water also being injected into the reactor.

The pressure of the reactor is adjusted to 1.5 bar with nitrogen. This moment is then regarded as the time T=0 of the start of polymerization. The conversion is followed by withdrawn samples which are immediately cooled in ice and monitoring is carried out by solids content with a thermobalance at 140° C. (Mettler Toledo HB43).

The polymerization is halted after 3 hours. The withdrawn samples are dried overnight in a ventilated oven at 100° C.

The particle size distribution of the final latex is measured using the Zetasizer 5000 apparatus, after diluting the latex in order to adjust the concentration necessary in the measurement cell.

The results obtained after polymerizing for 3 hours are as follows:

| | %* TDM | %* SLS | %* DBTTC | Level of solids (%) | Conversion at 270 min | D$_{50}$ (nm) |
|---|---|---|---|---|---|---|
| Core of comparative example 1 | 0.05 | 4.2 | 0 | 30 | 98.8% | 90 |

*by weight, with respect to the weight of monomers

The level of solids corresponds to the percentage by weight of solid material, with respect to the total weight of the polymerization medium after polymerizing for 3 hours, this level being measured using a thermo-balance.

The quantity D$_{50}$ corresponds to the diameter such that 50% by weight of the particles have a size which is less than said diameter shown in the table.

Once the core has been obtained, the synthesis of the shell is carried out.

To do this, the core latex obtained above is introduced, with stirring: at 150 revolutions/minute, into a 1 liter jacketed reactor placed under vacuum beforehand.

The medium is deoxygenated with 3 cycles of placing under vacuum and then under nitrogen, in order to render the atmosphere of the reactor inert, it is then left under vacuum and the reaction medium is heated to 80° C.

88 g of methyl methacrylate are introduced using a pump.

Once the temperature in the reactor has returned to 80° C., the solution of initiator (0.088 g of potassium persulfate dissolved in 15 g of water) is introduced. The temperature is maintained at 80° C. for 1 hour and then the reaction medium is cooled.

In order to be used as impact modifier, the core-shell copolymer is recovered in the form of a dry powder by a conventional method (atomization, coagulation/filtration/drying).

Example 1

A solution is prepared comprising 0.24 g of NaHCO$_3$ (fulfilling the role of buffer), 8.77 g of surfactant SLS (sodium lauryl sulfate) and 485 g of distilled water. The mixture is stirred and heated (up to approximately 50° C., until the surfactant has completely dissolved).

At the same time, a mixture is prepared comprising a chain-transfer agent tert-dodecyl mercaptan (abbreviation TDM) in a proportion of 0.10 g (i.e., 0.05% by weight, with respect to the weight of monomers (n-butyl acrylate+allyl methacrylate)), a sulfur-comprising agent dibenzyl trithiocarbonate (abbreviation DBTTC) of following formula (III):

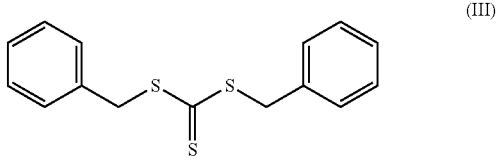

(III)

in a proportion of 0.36 g (i.e., 0.18% by weight, with respect to the weight of monomers (n-butyl acrylate+allyl methacrylate)) and 200 g of a mixture comprising n-butyl acrylate and allyl methacrylate in the respective proportions of 99.4/0.6.

The two above mixtures are introduced, with stirring at 150 revolutions/minute and at 65° C., into a 1 liter jacketed reactor placed under vacuum beforehand. The medium is deoxygenated with 3 cycles of placing under vacuum and then under nitrogen, in order to render the atmosphere of the reactor inert, and then is left under vacuum at 65° C. before introducing the initiator.

A solution is prepared comprising the polymerization initiator, potassium persulfate, in a proportion of 0.2 g in 15 g of water.

The solution obtained is introduced into an airlock (which corresponds to a small reservoir connected to the reactor) while flushing with nitrogen and is then injected into the reactor by nitrogen pressure. The airlock is rinsed with 40 g of water, still under nitrogen, the rinsing water also being injected into the reactor.

The pressure in the reactor is adjusted to 1.5 bar with nitrogen. This moment is then regarded as the time T=0 of the beginning of polymerization. The conversion is followed by withdrawn samples which are immediately cooled in ice and monitoring is carried out by solids content with a thermobalance at 140° C. (Mettler Toledo HB43).

The polymerization is halted after 3 hours. The withdrawn samples are dried overnight in a ventilated oven at 100° C.

The particle size distribution of the final latex is measured using the Zetasizer 5000 apparatus, after diluting the latex in order to adjust the concentration necessary in the measurement cell.

The results obtained after polymerizing for 3 hours are as follows:

|  | %* TDM | %* SLS | %* DBTTC | Level of solids (%) | Conversion at 270 min | $D_{50}$ (nm) |
|---|---|---|---|---|---|---|
| Core of example 1 | 0.05 | 4.0 | 0.18 | 28 | 98.8% | 30 |

*by weight, with respect to the weight of monomers

A significant reduction in the quantity $D_{50}$ can be seen in the presence of the sulfur-comprising agent.

Once the core has been obtained, the synthesis of the shell is carried out.

To do this, the core latex obtained above is introduced, with stirring at 150 revolutions/minute, into a 1 liter jacketed reactor placed under vacuum beforehand.

The medium is deoxygenated with 3 cycles of placing under vacuum and then under nitrogen, in order to render the atmosphere of the reactor inert, it is then left under vacuum and the reaction medium is heated to 80° C.

88 g of methyl methacrylate are introduced using a pump.

Once the temperature in the reactor has returned to 80° C., the solution of initiator (0.088 g of potassium persulfate dissolved in 15 g of water) is introduced. The temperature is maintained at 80° C. for 1 hour and then the reaction medium is cooled.

In order to be used as impact modifier, the core-shell copolymer is recovered in the form of a dry powder by a conventional method (atomization, coagulation/filtration/drying).

What is claimed is:
1. A process for making a core of a core-shell copolymer comprising the steps of:
   a) emulsion polymerizing in the presence of a radical polymerization initiator a polymerization mixture comprising i) one or more monomers comprising at least one ethylenic elastomeric monomer, ii) at least one crosslinking agent and iii) at least one sulfur-comprising additive of formula (I):

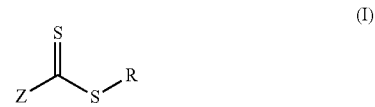

wherein:
R is —CH$_2$R$^1$, —CHR$^1$R$'^1$ or —CR$^1$R$'^1$R$''^1$, where R$^1$, R$'^1$ and R$''^1$, may be the same or different, and each are independently selected from optionally substituted saturated or unsaturated alkyl groups, optionally substituted aromatic carbocyclic or heterocyclic groups, optionally substituted alkylthio groups, optionally substituted alkoxy groups, optionally substituted dialkylamino groups, organometallic groups, acyl groups, acyloxy groups, carboxylic acid group or salts thereof, carboxylic acid ester groups, sulfonic acid groups or salts thereof, sulfonic acid ester groups, alkoxycarbonyl or aryloxycarbonyl groups or polymer groups; and Z is selected from hydrogen, halogen atoms, optionally substituted alkyl groups, optionally substituted aryl groups, optionally substituted heterocyclic groups, optionally substituted —SR$^2$ groups, optionally substituted alkoxycarbonyl groups, optionally substituted aryloxycarbonyl groups, —COOH, —OCOR$^2$, optionally substituted carbamoyl groups of formula —CONHR$^2$ or —CONR$^2$R$^3$, —CN, —P(=O)OR$^2$$_2$ groups, —P(=O)R$^2$$_2$ groups, polymer groups, —OR$^2$ groups or —NR$^2$R$^3$ groups;

where R$^2$ and R$^3$, may be the same or different, and are independently selected from C$_1$ to C$_{18}$ alkyl groups, C$_2$ to C$_{18}$ alkenyl groups, C$_6$ to C$_{18}$ aryl groups, heterocyclic groups, aralkyl groups and alkaryl groups, where each of these groups may optionally be substituted by at least one substituent selected from epoxy groups, hydroxyl groups, alkoxy groups, acyl groups, acyloxy groups, carboxyl groups or salts thereof, carboxylic acid ester groups, sulfonic acid groups or salts thereof, sulfonic acid ester groups, alkoxycarbonyl or aryloxycarbonyl groups, isocyanato groups, cyano groups, silyl groups, halogen atoms or dialkylamino groups; and where the crosslinking agent is selected from divinylbenzene, trivinylbenzene, vinyl acrylate, allyl methacrylate, vinyl methacrylate, butadienediol diacrylate, hexanecliol diacrylate, PEG diacrylate, trimethylolpropane trimethacrylate or mixtures thereof, and b) forming crosslinked elastomeric core particles.

2. The process of claim 1, wherein Z is —SR$^2$ and R is —CH$_2$R$^1$ to form a sulfur-comprising additive of formula (II):

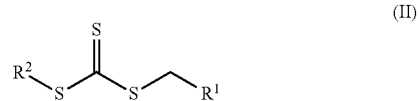

wherein R$^1$ and R$^2$ have the same meaning as in claim 1.

3. The process of claim 2, wherein R$^1$ is an aryl group and R$^2$ is an aralkyl group.

4. The process of claim 1 wherein the sulfur-comprising additive is selected from dibenzyl trithiocarbonate or dipropyltrithiocarbonate or salts thereof.

5. The process of claim 1, wherein the sulfur-comprising additive is present in the polymerization mixture in an amount ranging from 0.005 parts by weight to 5 parts by weight, per 100 parts of monomers.

6. The process of claim 1, wherein the ethylenic elastomeric monomer is selected from isoprene, a butadiene monomer, styrene, acrylonitrile, an alkyl (meth)acrylate monomer or mixtures thereof.

7. The process of claim 1 wherein the ethylenic elastomeric monomer comprises n-butyl acrylate.

8. The process of claim 1 wherein the crosslinking agent is allyl methacrylate.

9. The process of claim 1 wherein the polymerization mixture further comprises at least one surfactant and optionally at least one chain-transfer agent.

10. The process of claim 9, wherein the polymerization mixture comprises a chain-transfer agent that is selected from butyl mercaptan, n-octyl mercaptan, n-dodecyl mercaptan or tert-dodecyl mercaptan or combinations thereof.

11. The process of claim 1 wherein the emulsion polymerization is carried out in an aqueous dispersion medium.

12. A core-shell copolymer comprising elastomeric crosslinked core particles made by the process of claim 1, and wherein the core particles have a mean particle diameter of less than 50 nm.

13. The core-shell copolymer of claim 1 wherein the core-shell copolymer particles have a mean particle diameter of less than 60 nm.

14. A method of improving the properties of polymer matrices comprising adding one or more core shell copolymers of claim 13 to one or more polymer matrices and wherein the core-shell copolymers act as impact modifiers or protect the optical transparency of the polymer matrices or both.

15. A polymer matrix comprising at least one core-shell copolymer of claim 12.

16. The polymer matrix of claim 15, wherein the matrix is a thermoplastic matrix.

17. The polymer matrix of claim 16, wherein the thermoplastic matrix is selected from matrices comprising polyvinyl chloride, acrylonitrile/butadiene/styrene copolymer, acrylate/styrene/acrylonitrile copolymer, polycarbonate/polyester, polycarbonate/(acrylonitrile/butadiene/styrene copolymer), polycarbonate/(acrylate/styrene/acrylonitrile copolymer) or mixtures thereof.

18. A manufactured article comprising a polymer matrix of claim 16.

19. A process for preparing a core-shell copolymer, comprising the steps of:
a) preparing crosslinked elastomeric core particles according to the process of claim 1; and
b) contacting the core particles of step a) with one or more shell monomers intended to form a shell.

20. The process of claim 19, wherein at least one of the shell monomers is selected from alkyl (meth)acrylates, styrene monomers, acrylonitrile or mixtures thereof.

21. The process of claim 20, wherein at least one of the shell monomers is methyl methacrylate.

22. A method of reducing the mean particle size of crosslinked elastomeric core particles of core-shell copolymers comprising the steps of:

a) emulsion polymerizing in the presence of a radical polymerization initiator a polymerization mixture comprising i) one or more monomers comprising at least one ethylenic elastomeric monomer, ii) at least one crosslinking agent and iii) at least one sulfur-comprising additive of formula (I):

wherein:
R is —CH$_2$R$^1$, —CHR$^1$R'$^1$ or —CR$^1$R'$^1$R'''$^1$, where R$^1$, R'$^1$ and R'''$^1$, may be the same or different, and each are independently selected from optionally substituted saturated or unsaturated alkyl groups, optionally substituted aromatic carbocyclic or heterocyclic groups, optionally substituted alkylthio groups, optionally substituted alkoxy groups, optionally substituted dialkylamino groups, organometallic groups, acyl groups, acyloxy groups, carboxylic acid group or salts thereof, carboxylic acid ester groups, sulfonic acid groups or salts thereof, sulfonic acid ester groups, alkoxycarbonyl or aryloxycarbonyl groups or polymer groups; and Z is selected from hydrogen, halogen atoms, optionally substituted alkyl groups, optionally substituted aryl groups, optionally substituted heterocyclic groups, optionally substituted —SR$^2$ groups, optionally substituted alkoxycarbonyl groups, optionally substituted aryloxycarbonyl groups, —COOH, —OCOR$^2$, optionally substituted carbamoyl groups of formula —CONHR$^2$ or —CONR$^2$R$^3$, —CN, —P(O)OR$^2{}_2$ groups, —P(=O)R$^2{}_2$ groups, polymer groups, —OR$^2$ groups or —NR$^2$R$^3$ groups;

where R$^2$ and R$^3$, may be the same or different and are independently selected from C$_1$ to C$_{18}$ alkyl groups, C$_2$ to C$_{18}$ alkenyl groups, C$_6$ to C$_{18}$ aryl groups, heterocyclic groups, aralkyl groups and alkaryl groups, where each of these groups may optionally be substituted by at least one substituent selected from epoxy groups, hydroxyl groups, alkoxy groups, acyl groups, acyloxy groups, carboxyl groups or salts thereof, carboxylic acid ester groups, sulfonic acid groups or salts thereof, sulfonic acid ester groups, alkoxycarbonyl or aryloxycarbonyl groups, isocyanato groups, cyano groups, silyl groups, halogen atoms or dialkylamino groups; and where the crosslinking agent is selected from, divinylbenzene, trivinylbenzene, vinyl acrylate, alkyl methacrylate, vinyl methacrylate, butadienediol diacrylate, hexanediol diacrylate, PEG diacrylate, trimethylolpropane trimethacrylate or mixtures thereof, and b) forming crosslinked elastomeric core particles, wherein the mean particle size of the core particles is less than 50 nm.

* * * * *